Feb. 7, 1961 J. H. FOSTER ET AL 2,970,369

ASSEMBLY APPARATUS FOR ELECTRIC CIRCUIT ASSEMBLIES

Filed June 19, 1956 7 Sheets-Sheet 1

INVENTOR.
James H. Foster
BY Philip E. Sterner
Ralph Hamman
Attorney

ASSEMBLY APPARATUS FOR ELECTRIC CIRCUIT ASSEMBLIES

Filed June 19, 1956 7 Sheets-Sheet 2

INVENTOR.
James H. Foster
BY Philip E. Sterner
Ralph Hammar
Attorney

ASSEMBLY APPARATUS FOR ELECTRIC CIRCUIT ASSEMBLIES

Filed June 19, 1956 7 Sheets-Sheet 3

INVENTORS
James H. Foster
BY Philip E. Sterner
Ralph Hamman
Attorney

ASSEMBLY APPARATUS FOR ELECTRIC CIRCUIT ASSEMBLIES

Filed June 19, 1956 7 Sheets-Sheet 4

INVENTORS
James H. Foster
BY Philip E. Slemer
Ralph Hammar
attorney

ASSEMBLY APPARATUS FOR ELECTRIC CIRCUIT ASSEMBLIES

Filed June 19, 1956 7 Sheets-Sheet 5

INVENTORS
James H. Foster
BY Philip E. Sterner
Ralph Hammar
attorney

ASSEMBLY APPARATUS FOR ELECTRIC CIRCUIT ASSEMBLIES

Filed June 19, 1956 7 Sheets-Sheet 6

INVENTORS
James H Foster
BY Philip E Sterner
Ralph Hammar
attorney

INVENTORS
James H Foster
BY Philip E. Sterner
Ralph Hammar
Attorney

United States Patent Office 2,970,369

Patented Feb. 7, 1961

2,970,369

ASSEMBLY APPARATUS FOR ELECTRIC CIRCUIT ASSEMBLIES

James H. Foster and Philip E. Sterner, Erie, Pa., assignors to Erie Resistor Corporation, Erie, Pa., a corporation of Pennsylvania Filed June 19, 1956, Ser. No. 592,400

16 Claims. (Cl. 29—203)

This invention is intended to manufacture electric circuit assemblies each consisting of a plurality of interconnected circuit elements with terminals for making connections to the assembly. In electronic circuits, such assemblies may be used in the input and output of tubes, transistors, diodes, etc.

The specifications of the circuit assemblies depend on the use. Typically, the circuit assemblies may consist of from four to nine circuit elements such as resistors, inductances, transistors, diodes and capacitors. Not only will the resistors and capacitors vary in size with the desired end use of the assembly, but the circuit inter-connections will also vary. The manufacturer of the circuit assemblies, accordingly, must be able to accommodate changes in the number of circuit elements for each assembly, changes in the kind and size of those elements, and changes in the inter-connections between the elements and in the terminals for making connections to the assemblies. All of these can be accommodated in the apparatus presently to be described.

Figures 1, 1A, 1B, 2, 3:
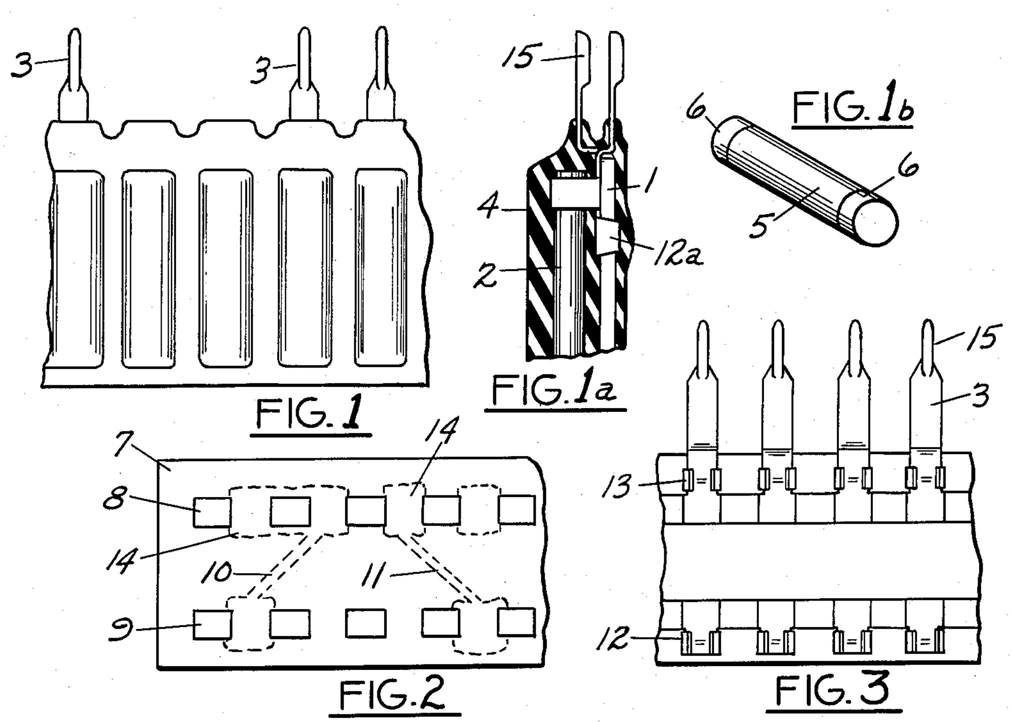
Figures 4, 5:
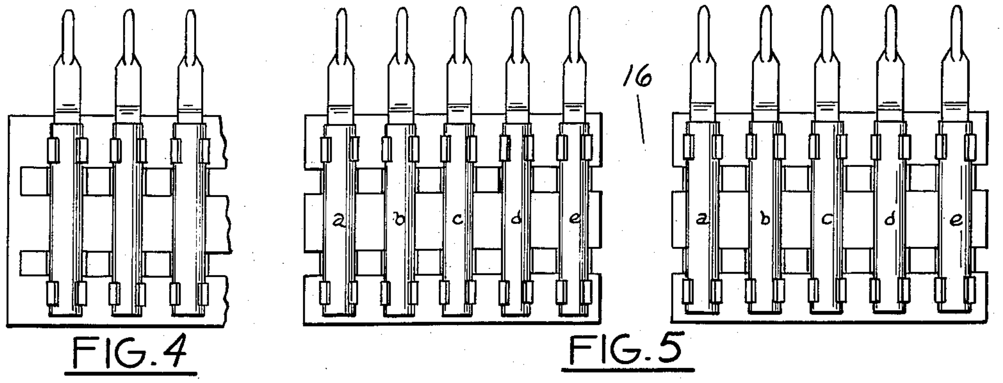
Figure 6:
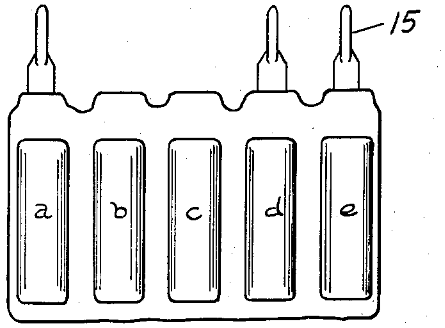
Figure 7:
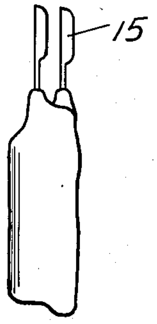
Figures 8, 10:
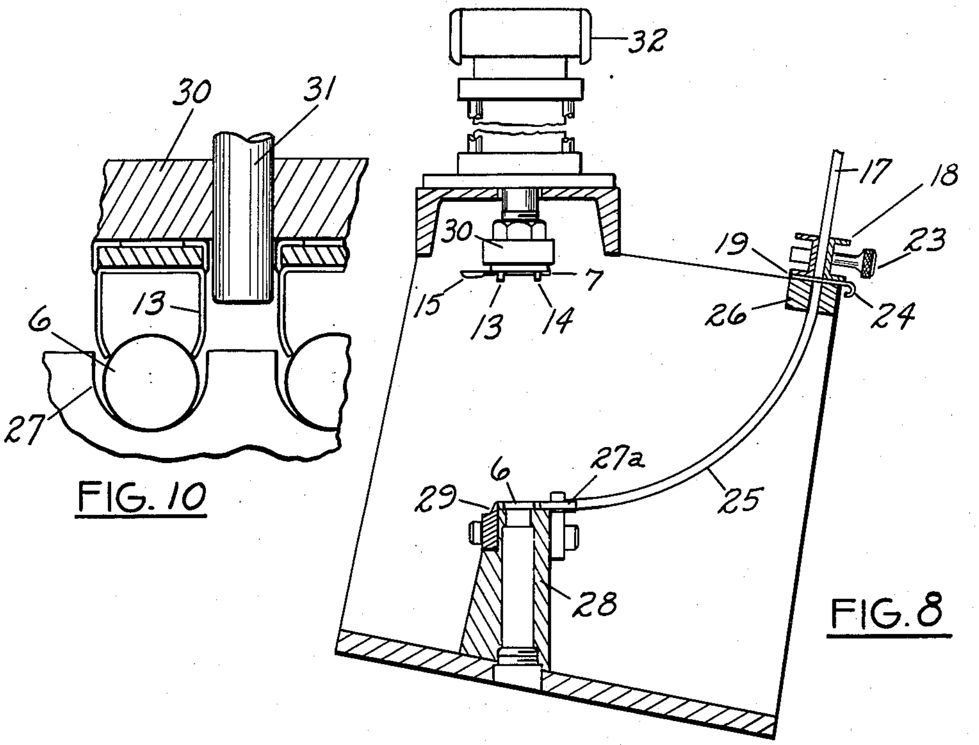
Figure 9:
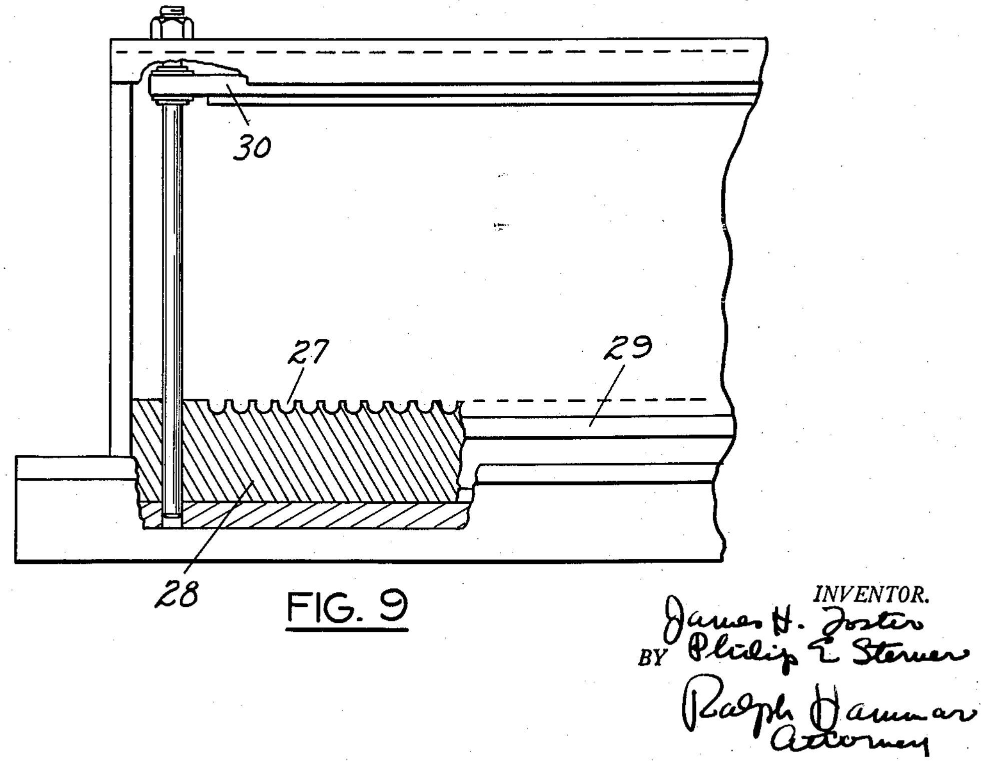
Figure 11:
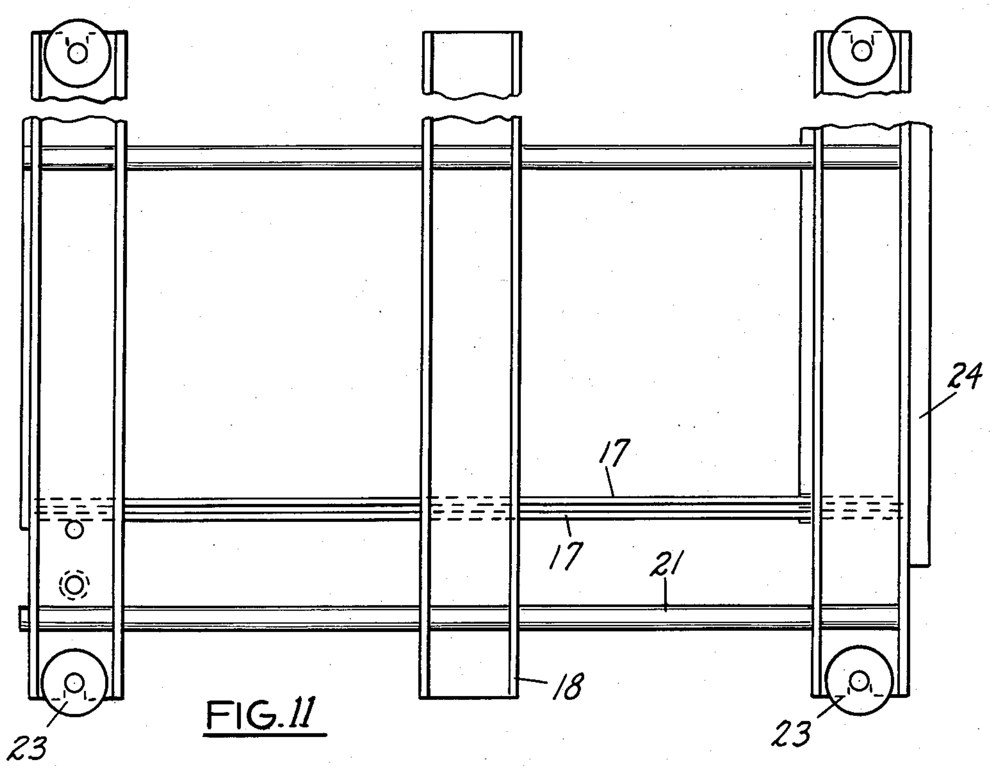
Figure 13:
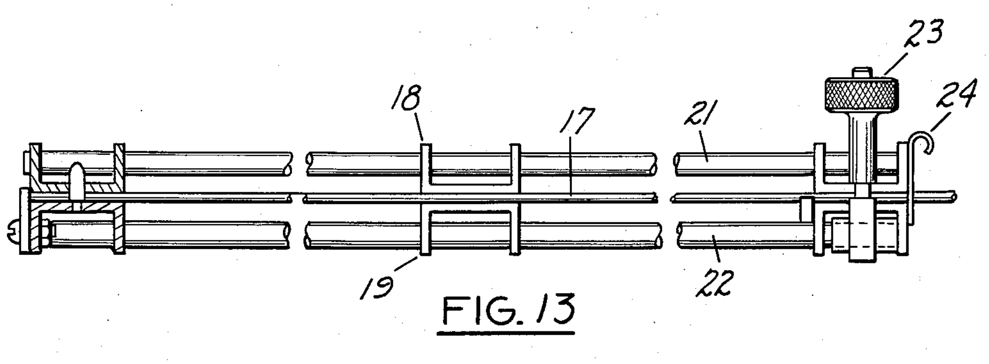
Figure 12:
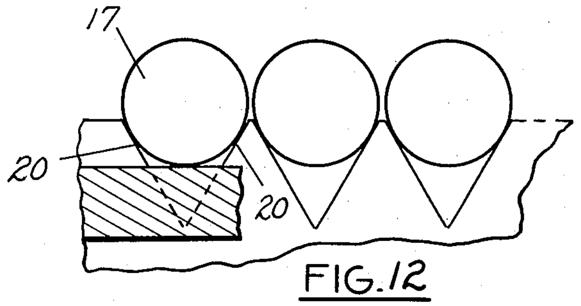
Figure 15:
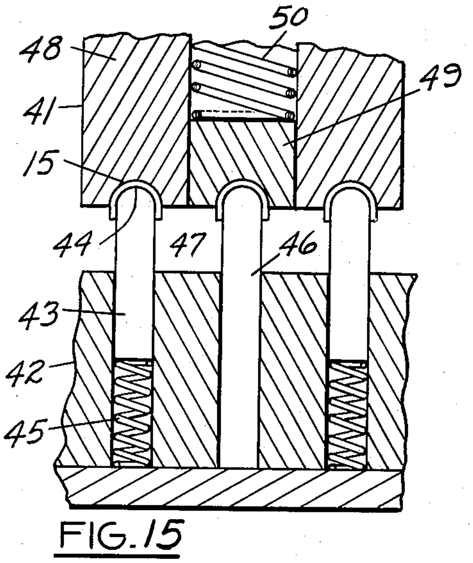
Figure 16:
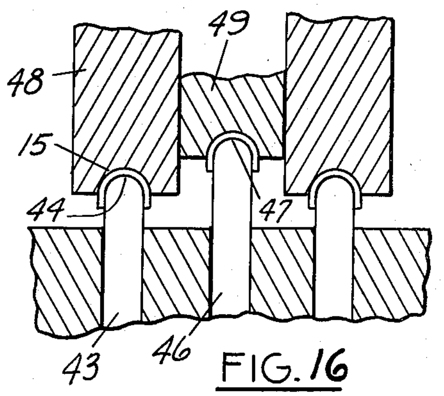
Figure 17:
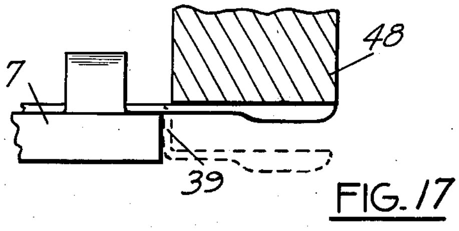
Figure 14:
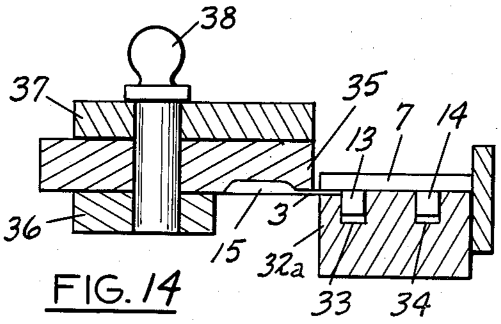
Figure 18:
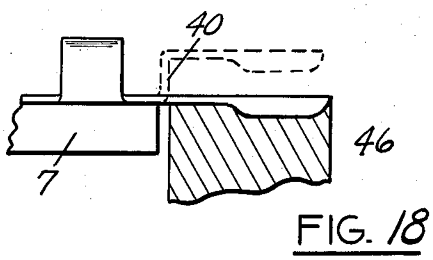
Figure 19:
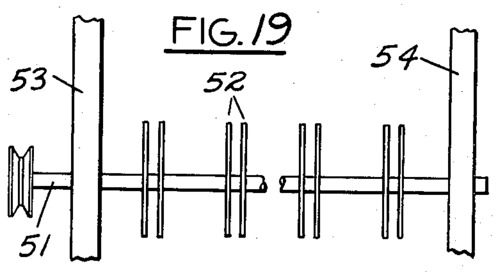
Figure 20:
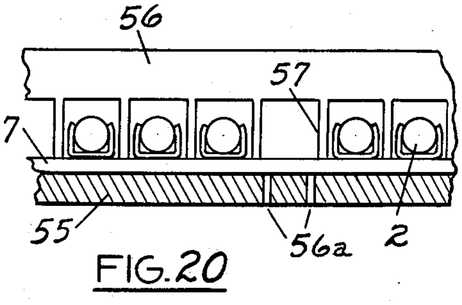
Figure 21:
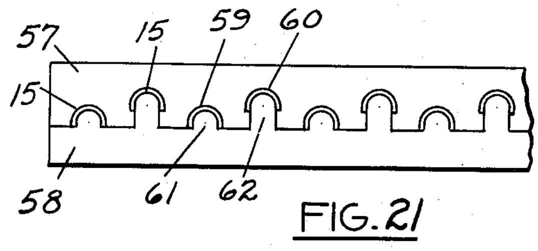
Figure 22:
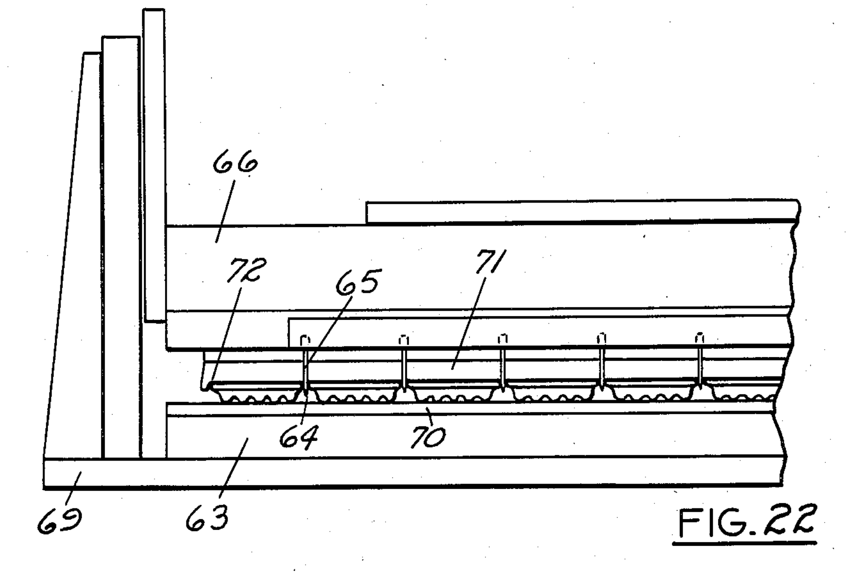
Figure 23:
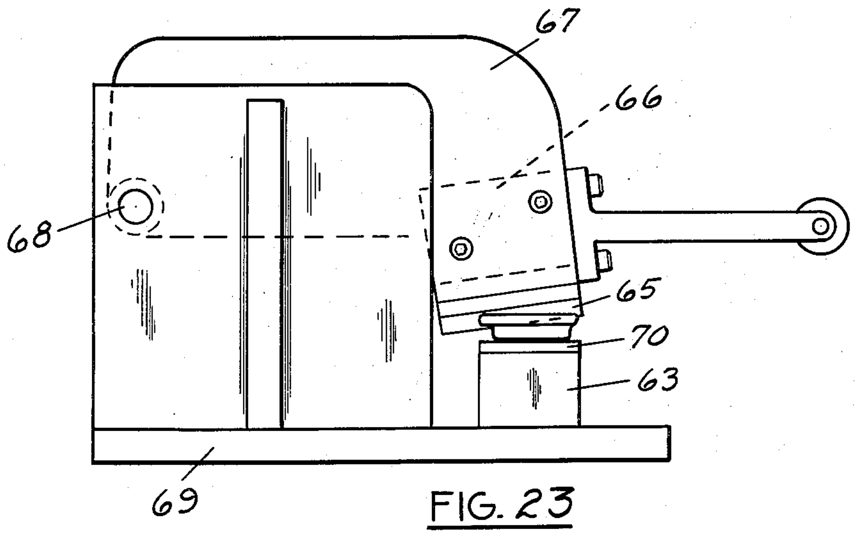
Figure 28:
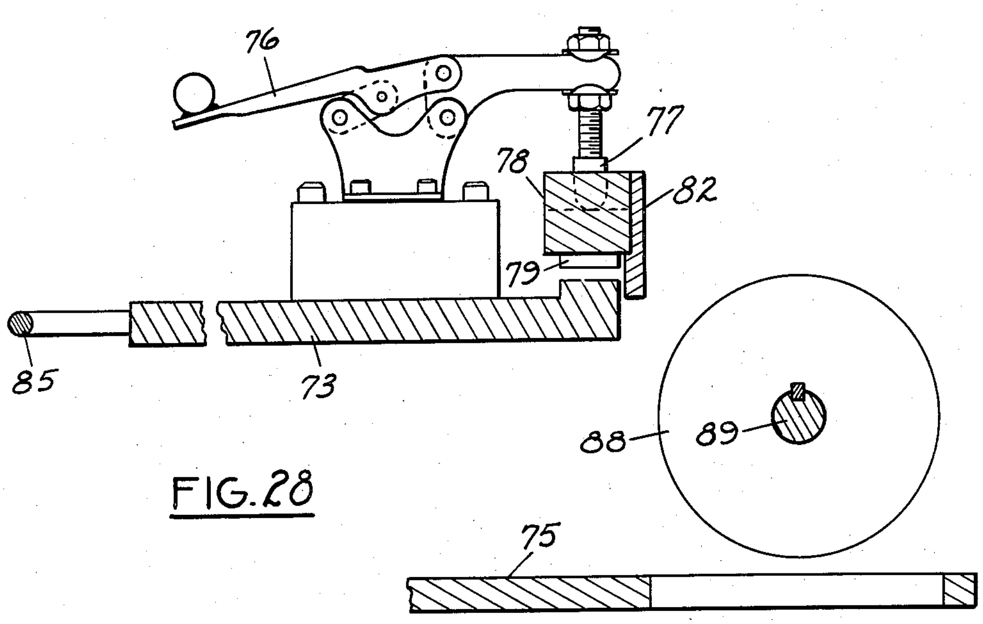
Figure 24:
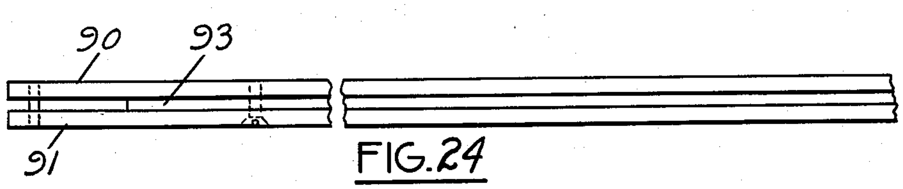
Figure 25:
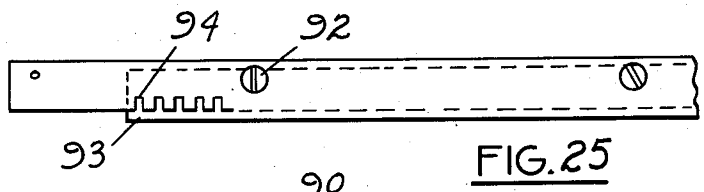
Figure 26:
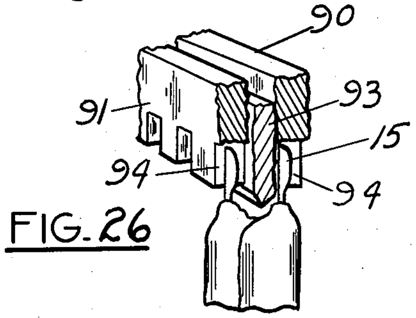
Figure 29:
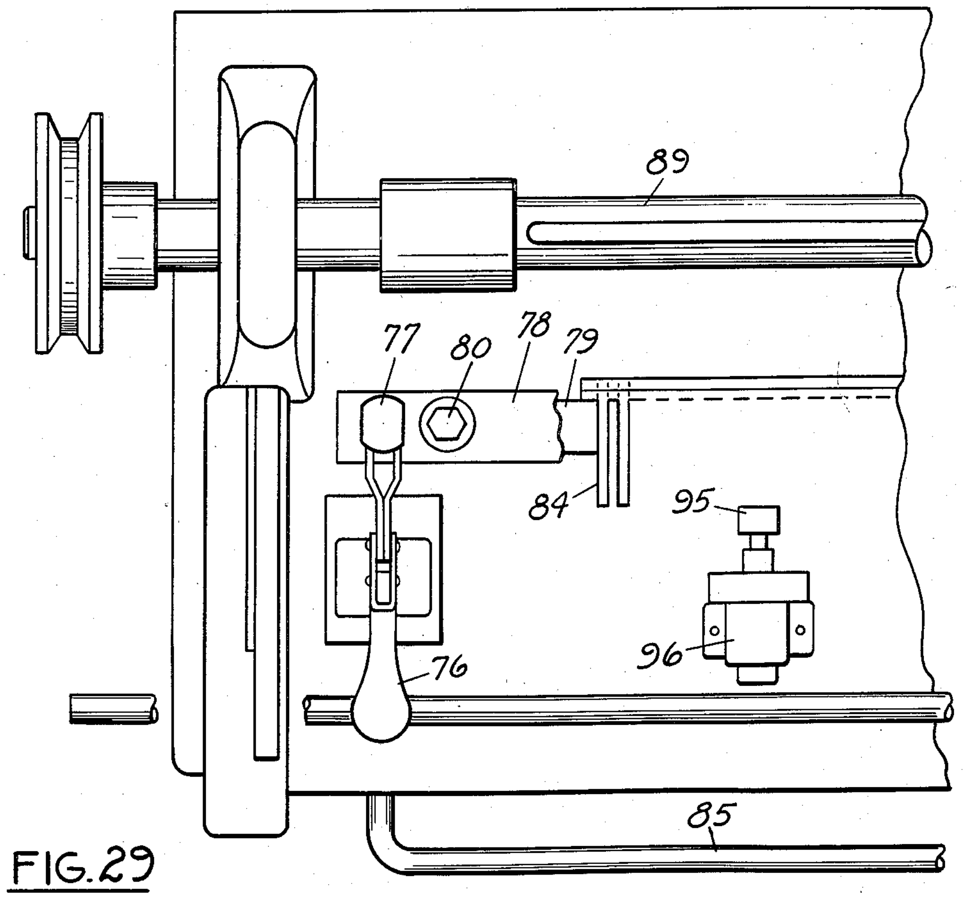
Figure 27:
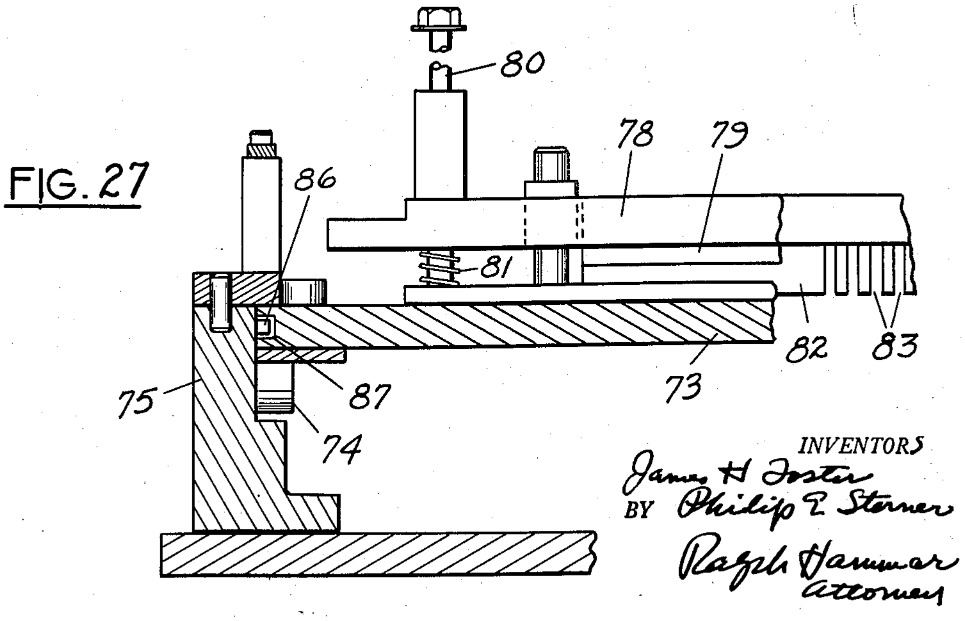

In the accompanying drawing, Fig. 1 is a plan view of an electric circuit assembly; Fig. 1*a* is an end view; Fig. 1*b* shows one of the components; Fig. 2 is a top plan view of a strip for making a plurality of the Fig. 1 circuit assemblies; Fig. 3 is a similar view of the strip with element receiving clips attached thereto; Fig. 4 shows the circuit elements mounted in the clips; Fig. 5 shows the individual circuit assemblies cut from the strip; Fig. 6 is a plan view and Fig. 7 is an edge view of a complete circuit assembly; Fig. 8 is a side view, partly in section, of loading equipment; Fig. 9 is a front view of the loading equipment; Fig. 10 is an enlarged view illustrating the assembly or loading of a circuit element into one of the clips on the strip; Fig. 11 is a plan of the magazine used in the loading equipment; Fig. 12 is an enlarged view of one of the clamping members of the magazine; Fig. 13 is an edge view of the magazine; Fig. 14 is a section through a cut off die for removing unwanted terminals; Fig. 15 is a fragmentary section through a forming die for offsetting the prongs of the terminals, the die being shown at the start of the forming operation; Fig. 16 shows the position of the forming die at the end of the forming operation; Fig. 17 is a side view of one of the prongs showing the operation of the forming die; Fig. 18 is a side view of a prong adjacent the Fig. 17 prong which is differently formed; Fig. 19 is a top plan view of the cut off machine; Fig. 20 is a fragmentary view of the clamp holding the strip against the saw table; Fig. 21 is a fragmentary view of the clamp holding the cut off assemblies in the same relation as existed prior to cut off; Fig. 22 is a front view of the labelling machine; Fig. 23 is a side view of the labelling machine; Fig. 24 is an edge view of another form of holder for the circuit assemblies; Fig. 25 is a plan view of the holder; Fig. 26 is an enlarged view showing the holder gripping two terminal prongs; Fig. 27 is a front view partly broken away of a cut off saw; Fig. 28 is a sectional end elevation showing the relation of the cut off saws and the strip holding saw table; and Fig. 29 is a fragmentary top plan view.

In Figs. 1 and 1*a*, there is shown a typical electric circuit assembly consisting of a base 1 of insulating material on which are mounted a plurality of electric circuit elements 2. Along one edge is a plurality of plug-in prongs 3 for making connection to the circuit assembly. The entire assembly is embedded in an insulating coating 4 which covers the circuit elements, the interconnections between the circuit elements, and the connections between the circuit elements and the prongs 3. The circuit assembly may, for example, be a filter or coupling network for use in an electronic circuit. While the circuit assembly may contain a large number of electric circuit elements and there may be a great many of inter-connections between those circuit elements in order to meet the requirements of a particular circuit, all of these are sealed in the protective insulating coating 4. The manufacturer using such a circuit assembly accordingly need only make connections to the projecting metallic prongs 3. This materially reduces the labor of making electronic circuits since the manufacturer no longer need handle individual circuit elements or make the inter-connections between the individual single circuit elements. Instead, the manufacturer handles a circuit assembly to which only relatively few connections need be made. Because of economies in manufacture which may be effected by elimination of the leads and insulating coating for the individual components, the cost of an assembly of a plurality of components is not appreciably different from the cost of the individual components when purchased separately.

The components for use in the circuit assembly are of the same physical dimensions so that the components are interchangeable in the circuit assembly. One such component is illustrated in Fig. 1*b*. The component has a cylindrical body 5 with terminals 6 at opposite ends. If the component is a resistor, the body 5 may be of one of the molded plastic resistance mixes. The resistance may vary from a few ohms to a number of megohms depending upon the composition of the mix. The terminals 6 may be metal caps molded unto the ends of the bodies or sprayed metal surfaces. If the component is a capacitor, the body 5 may be of tubular ceramic with inner and outer electrode coatings and the terminals 6 may be extensions of those electrode coatings. By choice of the ceramic, the capacitance will vary over a wide range. Whether the component is a resistor or a capacitor, the spacing and size of the terminals 6 will be the same.

Figs. 2 to 7, inclusive, show various stages in the manufacture of a plurality of electric circuit assemblies. Most usually these assemblies will comprise from four to nine resistors and capacitors. In Figs. 2 to 7, the assembly illustrated has five of these circuit components identified by the letters *a* to *e*, inclusive, any one of which may be a resistor or a condenser of any desired value.

The circuit assemblies are made in long strips which are cut off after manufacture to the desired length so that the individual circuit assemblies will contain the proper number of components. As shown in Fig. 2, the strip 7 of insulating material has spaced openings 8 and 9 arranged along opposite edges of the strip. On the under surface of the strip, as indicated by dotted lines, there are printed electric connections such as indicated at 10 and 11. These connections vary with the kind of circuit assembly to be made so that in this sense the strip 7, after the application of the printed connections 10 and 11, can only be used for the manufacture of one kind of electric circuit assembly. From the point of view of handling, it is convenient to have all of the strips 7 of the same physical dimension no matter what kind of circuit assembly is to be made because many of the operations to be performed are the same no matter what kind of electric circuit assembly is to be made. The strip 7, for example, may contain ninety-one of the holes 8 and 9, in which case it can be used to make fifteen of the five component circuit assemblies at one time. Ordinarily, the holes 8 and 9 will be punched after the printed wiring 10 and 11 has been applied. The holes 8 and 9 will be in the same position no matter what kind of printed wiring is used so that this is one of the operations which is entirely independent of the kind of circuit assembly to be made.

As described in greater detail in Patent No. 2,898,519, after the punching operation, clips 12 and 13 are stapled to the strip. Each of the clips has integral stapling arms **12*a* which extend through adjacent openings 8 or 9 as the case may be and are clinched to the section 14 between adjacent openings. The clips 12 and 13 are identical except that the clips 13 have prongs 3 with half round ends 15 as disclosed in that application which are used for making connections to the circuit assembly. The clips 12 and 13 may be applied uniformly throughout the entire length of the strip 7 or the clips may be applied in groups with one of the spaces 14** between each group left blank. If the latter procedure were followed with the five element assembly, the clip applying machine would apply five clips in succession and then skip one space and then start applying five clips repeating until the entire strip was filled with clips.

After the clips have been fastened to the strip, groups of components as shown in Fig. 5 are loaded into the clips. It will be noted that there is a space between each group and that the components in each group are arranged in the same order as indicated by the identifying letter. The loading of the components for the entire length of the strip can be done at one time by apparatus to be described. After the loading, the unwanted prongs 3 are cut off, the remaining prongs are formed to the desired shape, and the sections 16 between adjacent groups of circuit elements are cut out leaving the completed circuit assemblies which after dipping in insulating material and marking or coding reach the finished stage shown in Figs. 6 and 7. The foregoing is not a complete outline of all of the steps to be performed in the manufacture of the electric circuit assemblies but it indicates generally how the circuit assemblies are made.

As is evident from the general description, it is necessary that the proper components be loaded in each pair of clips 12 and 13. Apparatus by which this loading operation is accomplished simultaneously throughout the entire length of the strip is disclosed in Figs. 8 through 13, inclusive. To insure that the components are properly located in the strip, the individual components of each size and kind are loaded in a separate hollow tube 17 and the properly loaded tubes are arranged side by side in a magazine with the tubes on the same spacing as the clips. The magazine has clamping members 18 and 19 each of which has V clamping faces 20 for each of the tubes 17 as is diagrammatically shown in Fig. 12. The clamping members need not extend throughout the full length of the tubes. As shown in Fig. 11, there are three pairs of clamping members 18 and 19 rigidly connected by rods 21 and 22 and held together by clamping nuts 23 at the four corners. It is relatively easy to load components of the same kind into the hollow tubes 17 and since there may be a hundred or more components in each of the tubes 17, the labor of loading the tubes 17 into the magazine or clamping fixture in the proper order is very small per component. The individual components are held in the tubes by a gate 24 which can be slid out of the way to release the components. For the five element circuit assembly of Figs. 2 to 7, inclusive, the tubes 17 would be arranged in the V clamping faces 20 in groups of five with the tubes in each group containing components in the orders *a, b, c, d, e,* so as to correspond to the finished circuit assembly.

The actual placing of the components in the clips is done in the press shown in Figs. 8, 9 and 10. On one side of the press is a plurality of spaced arcuate delivery tubes 25 on the same spacing as the tubes 17 in the magazine. The upper end of the tubes 25 is in a support 26 on which the magazine is mounted. When so mounted, the tubes 17 holding the components register with the delivery tubes 25 so that as the gate 24 is slid away from the lower end of the tubes 17, the components fall by gravity down into the delivery tubes 25. The components pass through the lower or delivery end **27*a* of the tubes 25 into arcuate grooves 27 in a stationary bed 28 on the press. A stop plate 29 positions the components so that the terminal surfaces 6 are in alignment with the downwardly presented clips 13 and 14 on the strip 7 which is suitably fastened to the underside of the platen 30 of the press. The strip can be accurately indexed and positioned on the platen by means of pins 31 fitting in the holes 8 and 9. By means of an air cylinder 32, the platen 30 is moved downward and the clips in effect are pressed onto the terminal surfaces 6 and pick the components out of the arcuate grooves 27. The relation of the clips to the terminal surfaces 6 on the components and the grooves 27 in the bed of the press is more clearly shown in the enlarged view, Fig. 10. It will be noted from this view that the components can be readily supported in the grooves 27 and that the downward pressure of the clips has little tendency to break the components. This arrangement is much simpler than as though the components were somehow held on the underside of the platen 30 of the press and were pressed downward into clips supported on the bed 28 of the press. The components are merely held by gravity in the grooves 27 which provide the complete support for the components. Since the grooves 27 accurately register with the clips on the strip 7, all of the components can be loaded into the clips at one time. As the upper platen 30 of the press is lifted, another component slides out of each delivery tube into its groove 27 so that when a new strip is loaded on the underside of the upper platen 30**, the press is ready for immediate closing to load the components into the clips of that new strip.

It will be noted that this loading press is entirely independent of the kind and number of components to be loaded. The kind of components is determined by the loading into the tubes 17 of the magazine. It makes no difference whether the component is a resistor or a capacitor. It also makes no difference whether the components are loaded in groups of five or in any other pattern. If it were necessary, the entire ninety clips could be loaded at one time without in any way changing the operation.

Before the components are loaded into the clips 13 and 14, it is desirable that the prongs 3 which are not needed be cut off. This can be done in a simple cut off die having a section **32*a* for receiving the strip 7 with the clips 13 and 14 located in recesses 33 and 34. When so located, the prongs 3 project into the path of cut off punches 35 which cooperate with the section 32*a* to sever the unwanted prongs. Since the number of prongs to be cut off will vary with each kind of circuit assembly, the cut off punches 35 have to be set up for each circuit assembly. In the construction shown, the punches 35 are inserted between bottom and top holders 36 and 37 and are held in place by retaining pins 38. In general, less than half of the prongs will be cut off so that while the die will have a station opposite each of the prongs 3, there will be punches 35** at less than half of these stations in any circuit assembly.

Following the cut off operation, the prongs 3 may be formed so that alternate prongs are offset alternately to one and to the other side of the strip 7. From a side view, the prongs 3 after forming appear to have angular sections 39 and 40 connecting the prongs to the clips. The angular sections 39 are formed tight against the edge of the strip 7 while the angular sections 40 are offset away from the strip 7. These forming operations are accomplished in the die indicated in Fig. 15 where there are upper and lower platens 41 and 42 which move toward each other during the forming operation. The lower platen 42 has alternate punches 43 which have rounded upper ends 44 fitting in the underside of the half round ends 15 of the prongs 3. The punches 43 are spring loaded by springs 45 so that they retract as the upper platen descends. The lower platen also has fixed punches 46 with similarly rounded upper ends 47 fitting the underside of the half round ends 15 of the prongs 3. The upper platen 41 has rigid sections 48 opposite the spring loaded punches 43 and has retractable sections 49 loaded by springs 50 opposite the punches 46. The operation of the press, the platens 41 and 42 move toward each other and the prongs 3 are offset the distance required by the movement of the rigid parts 46 and 48. Only the forming parts of the die are illustrated, but it is obvious that the die must contain some part for supporting the strip 7 during the terminal or prong forming operation.

After the component loading and terminal cut off and forming operations, the terminals of the individual components are preferably soldered to the clips and soldered connections are also made between the clips and the wiring carried by the strip 7. Because of the fact that all of the soldered connections are precisely located with respect to the strip 7, the soldering can be carried out by machine. Since apparatus for performing the soldering operations automatically is well known, it need not be illustrated for the purpose of this application. Dip soldering may be used. Apparatus such as shown in Patent No. 2,870,532, January 27, 1959, Francis R. Young, may also be used.

The individual sections or circuit assemblies are now cut from the strip 7 by apparatus illustrated in Figs. 19, 20 and 21. Fig. 19 shows the cut off saw having an arbor 51 carrying pairs of saws 52 spaced apart from each other the distance between adjacent holes 8 or 9 so as to cut out the sections of the strip 7 between adjacent circuit assemblies. In the case of the five element circuit assembly illustrated in this application, there will be fourteen pairs of saws 52 so that at the end of the cutting operation, there will be fifteen five element circuit assemblies made from the strip 7. The number of saws 52 and the number of circuit assemblies made from the strip obviously must vary with the number of elements in each circuit assembly. Fig. 20 shows the holder for the strips which located the strips with reference to the saws and holds the strip firmly during the cut off operation. The holder is guided on guideways 53 and 54 at opposite ends of the arbor 51. The strip is mounted on a bottom plate 55 having slots **56*a* for accommodating the saws 52. The strip 7 is clamped against the upper surface of the holder 55 by a bar 56 having depending clamping fins 57 which are thin enough to extend between adjacent circuit elements 2. When the bar 56 is clamped against the holder 55, the strip is firmly held against the holder so that the saws 52 can make clean cuts through the strip. The saws 52 need only project above the holder 55 a distance slightly more than the thickness of the strip 7 of insulating material, since once the strip 7 is severed, the circuit assemblies are separated from the strip. At the same time that the strip is clamped between the parts 55 and 56, the half round ends 15 of the prongs 3 are clamped between upper and lower clamping members 57 and 58 which have clamping surfaces offset in the same manner as the prongs. The upper member 57 has alternate shallow and deep slots 59 and 60 and the lower clamping member has alternate low and high projections 61 and 62 complementary to the slots 59 and 60. Accordingly, when the clamping bars 57 and 58 are clamped together, the prongs 3 are gripped by their half round ends 50 and are firmly located in the same position they occupied at the end of the forming operation. At the end of the cut off operation, when the circuit assemblies are severed from the strip 7, the clamping members 55 and 56 are released but the clamping members 57 and 58 are not released so that the assemblies occupy with relation to these clamping members the same position they occupied with relation to the strip 7. From one aspect, the clamping members 57 and 58** now function as a holder for the circuit assemblies.

By using the clamping members 57 and 58 as a holder, the circuit assemblies may be dipped in insulating material which will form an insulating case protecting the components and the soldered connections to the clips and to the wiring. Because the half round ends 15 of the prongs 3 are clamped between the members 57 and 58, these ends can easily be kept out of the insulating material and will remain clean. The dipping can be followed by a drying or curing operation in which the insulating material is set up to form an insulating case. During this drying operation, the clamping members 57 and 58 serve as supports for groups of the circuit assemblies.

At the end of the drying operation, the circuit assemblies must be labelled which can be conveniently done with the apparatus illustrated in Figs. 22 and 23. The circuit assemblies while still fastened between the clamping members 57 and 58 are laid face down on a table 63 so that between each circuit assembly there is a space 64 which registers with a cutting blade 65 carried by a bar 66 at one end of an arm 67 hinged at 68 to a base 69. For the five element circuit assemblies described, there will be fourteen cutting blades 59. The table 63 may have a sponge rubber facing 70 and a similar sponge rubber facing 71 may be on the underside of the bar 66. Because the circuit assemblies are precisely located with respect the clamping members 57 and 58, it is easy to use these clamping members as locators for positioning the circuit assemblies on the table 63 so that the circuit assemblies will line up with the cutting blade 65. The actual labelling is effected by a strip 72 of adhesive tape carrying the appropriate legend which extends the full length of the circuit assemblies and carries appropriate legends identifying the assemblies. After the circuit assemblies are laid on the table, the strip 72 is laid across the circuit assemblies and the arm 67 is swung downward first to press the strip into adhesive contact with the back surface of the assemblies and second to force the cutting blade 65 down between the assemblies and to sever the adhesive strips. The circuit assemblies are now ready for packaging and shipment.

In Figs. 24 to 29, inclusive, is shown another arrangement for cutting off the individual circuit assemblies and for holding the cut off assemblies while subsequent operations are performed. In the cut off machine shown in Figs. 27 to 29, inclusive, there is a saw table 73 mounted on rollers 74 on a base 75. At each end of the saw table is a clamp 76 having a clamping member 77 which engages a longitudinal clamping bar 78 faced on its underside with sponge rubber or equivalent resilient material 79. The clamping bar 78 is guided at each end on posts 80 and is urged upward away from the saw table by springs 81. At the back of the clamping bar 78 is a stop 82 which projects below the back edge of the saw table 73 and has slots 83 registering with the center lines of the square holes 8 and 9 in the strip 7 on which the electric circuit assemblies are mounted. Since the cut off machine is intended to accommodate any of the circuit assemblies which may be assembled on the strip 7, for the particular strip illustrated where there are ninety-one holes 8 and 9 there will be eighty-nine of the slots 83. The reason there are two less of the slots 83 than there are holes 8 and 9 is that it will never be necessary to cut through the end holes in the strip 7. The saw table 73 has similar slots 84 which form continuations of the slots 83. At the front, the saw table has a handle 85 for moving it forward and backward on the rolls 74. Suitable stops such as pin 86 and slot 87 limit the movement of the saw table.

When the saw table is in its forward position, a strip 7 is laid on the table with its rear edge against the backing member 82 and with the terminal prongs 3 projecting toward the front of the saw table. The components are on the upper face of the strip 7 presented toward the sponge rubber facing 79 on the clamping bar and are located between the slots 84 on the saw table. With the strip thus located the clamping bar 78 is lowered into clamping engagement with the components by means of the clamp 76. The sponge rubber facing 79 conforms to the components and firmly holds the smooth undersurface of the strip 7 against the saw table. As the saw table is slid backward, saws 88 on an arbor 89 cut through the strip at the desired locations so that at the end of the sawing operation only the individual sections or circuit assemblies have been cut from the strip. For the five component circuit assembly illustrated, there would be fifteen separate circuit assemblies at the end of the sawing operation.

Before releasing the clamps 76, it is desirable that the separate circuit assemblies be gripped by a holder to carry through the succeeding operations. Such a holder is illustrated in Figs. 24, 25 and 26 and comprises upper and lower bars 90, 91 fastened together at the back by screws 92 and having fastened therebetween a bar 93 of thickness corresponding to the space between offset terminals 15 on the circuit assemblies. The bar 93 projects beyond the front edges of the bars 90 and 91 and the projecting edge is suitably rounded or tapered so that it will readily enter in the space between the terminal prongs 15. The front edges of the bars 90 and 91 have slots 94 for receiving and frictionally gripping the terminal prongs 15. Both the upper and lower bars 90 and 91 have sufficient slots 94 to receive the terminal prongs 15 so that under any arrangement of the terminal prongs there will always be a slot 94 to receive each terminal prong 15 remaining in the circuit assemblies.

In use, prior to the loosening of the clamps 76, a holder is laid on the saw table with its back engaging plungers 95 on air cylinders 96 carried by the saw table and with its slotted front edge presented toward and registering with the terminal prongs on the circuit assemblies. When the saw table has been moved backward away from the saws 88, the air cylinders 96 can safely push the holders onto the prongs 15. Since the circuit assemblies are securely held by the clamping bar 78, the terminal prongs 15 in the circuit assemblies register with the notches 94. If the holder were forced onto the terminal prongs before the cut off operation, the holder would interfere with the saws 88. By attaching the holder to the terminal prongs after the sawing operation, there is no danger of interference with the saws. After the holders have been forced onto the prongs 15, the circuit assemblies are held in the same position they occupied while attached to the strip 7 in the same manner as by the clamp of Fig. 21 and the succeeding operations of applying the insulating case and labelling the circuit assemblies can be carried out in the same manner as that described in conjunction with the clamp of Fig. 21.

Although there are a great many variations in the kind of circuit assembly, the equipment is not greatly affected by these variations. If the strips 7 carry printed wiring, it must be that required by the kind of circuit assembly. The magazine tubes 17 must be loaded with the proper kind and size of component. The die for cutting off unwanted terminals (Fig. 14) must be set up to leave untouched the terminals which are to remain. The saws in the cut off machine (Fig. 19 or Figs. 27–29) must be set up to cut the strip between the groups of components and a similar set up made in the labelling machine (Fig. 22). Except for these, the equipment is unaffected by the kind of circuit or the components used.

What is claimed as new is:

1. An assembly press comprising a lower platen having a plurality of upwardly facing grooves side by side, a plurality of side by side chutes, each chute feeding into one end of each groove, a magazine having a plurality of side by side tubes respectively aligned with the chutes for receiving components in end to end relation, whereby any desired grouping of components can be fed from the magazines through the chutes into the grooves, said components having terminals at each end, an upper platen having means for holding a strip of insulating material having fixed thereto pairs of clips respectively presented toward and registering with the terminals of components in the grooves, means for closing and opening the press whereby as the press is closed the clips grip the components and as the press is opened the clips lift the components out of the grooves.

2. An assembly press for loading a plurality of components into clips comprising a lower platen having a plurality of upwardly facing grooves side by side, a plurality of side by side chutes, each chute feeding components into one end of each groove, means stopping movement of components out the other end of each groove, a magazine having a plurality of side by side holders respectively aligned with the chutes for slidably receiving components in end to end relation and including means for urging the components into the respective chutes, said holders each receiving like components and being loaded into the magazine in a predetermined order whereby any desired grouping of components can be fed into the grooves, said components having terminals at each end, an upper platen having means for holding a strip of insulating material having fixed thereto pairs of clips respectively presented toward and registering with the terminals of components in the grooves, means for lowering and raising the upper platen whereby as the upper platen is lowered, the clips grip the components and as the upper platen is subsequently raised, the clips lift the components out of the grooves and are replaced by new components.

3. An assembly press for loading a plurality of different kinds or sizes of components into pairs of clips, said components having terminals spaced to be received by the clips of any pair, comprising means for holding individual components in position to be received by the clips, means associated with the holding means for feeding individual components to the holding means, a strip of insulating material having fixed thereto pairs of clips respectively presented to and registering with the terminals of the individual components in the holding means, and means for pressing the strip toward the holding means whereby the clips are pressed onto and grip the components.

4. In the manufacture of electric circuit assemblies, a press having an upper platen with means for holding a strip of insulating material having on one face a plurality of clips arranged in pairs for holding and making electrical connection to the terminals of pin-like components with the clips facing downward, a lower platen having component receiving grooves respectively opposed to and aligned with one of the pairs of clips, means for loading a component into each of a plurality of the grooves, means for closing the press to force the clips onto the components, and means for opening the press whereby as the press is opened the components are lifted out of the grooves.

5. Assembly apparatus for the manufacture of electric circuit assemblies from circuit components and a strip of insulating material having on one face a plurality of spaced pairs of clips with the respective pairs adapted to hold and to make electrical connection to the terminals of the components, means including a magazine for feeding individual components successively to positions in which the components have a spacing corresponding to the spacing of the clips, means for supporting the components in said positions, and means for advancing the strip toward the components with the clips presented to and forced onto the components whereby as the strip is retracted the components are lifted away from said positions.

6. Assembly apparatus for the manufacture of electric circuit assemblies from circuit components and strips of insulating material having on one face a plurality of spaced pairs of clips with each pair adapted to hold and to make electrical connection to the terminals of a component, a plurality of feeding means each successively feeding a single kind of component one at a time to a definite position with the positions of the components from the different feeding means corresponding to the positions of the pairs of clips, means for supporting components in the position to which they are fed, and means for advancing the strip toward the components with the clips presented to and forced onto the components whereby as the strip is retracted the components are lifted away from said positions.

7. An assembly press having upper and lower platens, said lower platen having a plurality of upwardly facing grooves side by side, a plurality of side by side chutes, each chute feeding into one end of each groove, a magazine having a plurality of side by side tubes respectively aligned with the chutes for receiving components in end to end relation, whereby any desired grouping of components can be fed through the chutes into the grooves, said components having terminals at each end, means for locating a strip of insulating material having fixed thereto side by side pairs of clips for receiving the terminals of the components with the clips presented toward and registering with the terminals of the components in the grooves, and means including said upper platen for pressing the strip toward the components to grip the same by the clips and for lifting the strip away from the grooves to lift the components out of the grooves.

8. Assembly apparatus for the manufacture of electric circuit assemblies from pin-like components and a strip of insulating material having on one face a plurality of clips arranged in pairs spaced along the length of the strip for holding and making electrical connection to the terminals of the pin-like components, a press having upper and lower platens, said lower platen having component receiving grooves on the same spacing as the pairs of clips, means for loading a component into each of a plurality of the grooves, means for locating the strip between the platens with the pairs of clips presented toward and registering with the terminals of the components in the grooves, and means for closing the press to force the clips onto the components and for lifting the strip as the press is opened to lift the components out of the grooves.

9. Assembly apparatus for the manufacture of electric circuit assemblies from pin-like circuit components and a strip of insulating material having on one face a plurality of clips arranged in pairs spaced along the length of the strip for holding and making electrical connection to the terminals of the pin-like components, a press having a pair of platens, one of the platens having component receiving grooves on the same spacing as the pairs of clips on the strip, the other of the platens being adapted to cooperate with the opposite face of the strip to press the strip and the clips carried thereby onto the terminals, means for closing and opening the press, and means for locating the strip in position so the clips register with and are pressed onto the components as the press is closed and for separating the strip away from the grooves to lift the components out of the grooves upon opening of the press.

10. Assembly apparatus for the manufacture of electric circuit assemblies from a strip of insulating material having on one face a plurality of clips arranged in pairs spaced along the strip for holding and making electrical connection to the terminals of pin-like components each with terminals at opposite ends, means for supporting a plurality of components with the terminals thereof on the same spacing as the clips, means for pressing the strip toward the components with the respective pairs of clips thereon presented to and simultaneously moved into gripping engagement with the terminals of a component, and means for retracting the strip to carry away the components as a group.

11. Assembly apparatus for making a group of electric circuit assemblies from components of identical mechanical form having pin-like bodies with terminals at each end, said group utilizing a strip of insulating material having rows of index holes along opposite edges and carrying (*a*) a printed wiring pattern for making the desired circuit interconnection between the components having some parts of the pattern between adjacent index holes, (*b*) an aligned pair of clips for each component with the fastening means for the individual clips straddling adjacent index holes and contacting said parts of the pattern, means for feeding a group of components along separate paths transverse to the strip to positions in alignment with the respective pairs of clips, means for supporting the components in said positions, means for locating the strip by the index holes and pressing the strip toward the support with the clips presented to the group of components to cause the clips to grasp the components and electrically and mechanically be connected to the same, and means for moving the strip away from the support to lift the group of components off the support.

12. Assembly apparatus for making a group of electric circuit assemblies each containing a definite number and kind (variable from time to time) of pin-like circuit components of identical mechanical form with terminals at each end and circuit interconnections and utilizing a strip of insulating material having aligned pairs of index holes at regularly spaced ntervals and a pattern of printed wiring for circuit interconnections with parts of the pattern between adjacent holes, spaced clips along one edge of the strip with fastening means extending through and straddling adjacent holes in electrical contact with said parts of the pattern, said clips having plug-in prongs projecting beyond said one edge of the strip, and other correspondingly spaced clips respectively aligned with the first clips and with fastening means extending through and straddling adjacent holes in electrical contact with said parts of the pattern, means for feeding a row of said pin-like components along separate paths into positions of the same regular spacing as the clips, means for supporting the components in said position, means for relatively moving the strip and row of components toward each other to press the components into the clips, and means for thereafter utilizing the regularly spaced holes and prongs for locating the assemblies for finishing and operations including cutting the strip into individual assemblies and applying an insulating coating.

13. Apparatus for the manufacture of electric circuit assemblies in which active circuit components of assorted kinds of electrical function are assembled on a strip which may be cut into arbitrarily varied lengths which form part of the finished product, comprising means for holding a strip and a row of active circuit components in an arbitrarily varied assortment side by side on a spacing in said row such that the distance between components in the row is an integral number of times the spacing between adjacent components, operating means for acting on said strip and components, said operating means having parts also arranged on said spacing so as to be compatible with the assemblies, and indexing means for positioning said strip relative to said operating means.

14. The apparatus of claim 13 in which the strip has a pair of clips for each component on the same spacing as said components and has index holes between adjacent clips and in which the indexing means comprises parts fitting in said index holes.

15. The apparatus of claim 13 in which the strip has a pair of clips for each component on the same spacing as said component with at least part of the clips having prongs projecting beyond one edge of the strip, and in which the indexing means comprises a clamp engaging said prongs.

16. Apparatus for making a group of electric circuit assemblies each having components of identical mechanical form having pin-like bodies with terminals at each end and said group and utilizing a strip of insulating material of length sufficient to make the group of assemblies and carrying (*a*) a printed wiring pattern for making the desired circuit interconnection between the components of each assembly (*b*) an aligned pair of regularly spaced clips for each component with some of the clips making contact with some part of the patterns and with one clip of each pair having a plug-in prong projecting from the strip, means for feeding components to each assembly along separate paths transverse to the strip into positions of the same regular spacing as the respective pairs of clips, means for supporting the components in said positions, means for pressing the components and clips together as a group to electrically and mechanically connect the same, and means for holding the components on said spacing for finishing operations including cutting the strip into individual assemblies and applying an insulating coating.

References Cited in the file of this patent

UNITED STATES PATENTS

| | | |
|---|---|---|
| 623,330 | McCadden | Apr. 18, 1899 |
| 1,289,857 | Maynard | Dec. 31, 1918 |
| 1,305,858 | Yeomans | June 3, 1919 |
| 1,311,590 | Bingham | July 29, 1919 |
| 2,090,422 | Lynch | Aug. 17, 1937 |
| 2,355,833 | Bertalan | Aug. 15, 1944 |
| 2,357,693 | Samson | Sept. 5, 1944 |
| 2,515,487 | Bertalan | July 18, 1950 |
| 2,535,229 | Paolantonio | Dec. 26, 1950 |
| 2,599,011 | Phipard | June 3, 1952 |
| 2,613,861 | Goerlitz | Oct. 14, 1952 |
| 2,662,646 | McCain | Dec. 15, 1953 |
| 2,694,249 | Kapp | Nov. 16, 1954 |
| 2,757,443 | Steigerwalt | Aug. 7, 1956 |